March 17, 1953 W. R. CHANCELLOR 2,631,636
ANTISKID DEVICE FOR VEHICLES
Filed Sept. 22, 1951 2 SHEETS—SHEET 1

Inventor
William R. Chancellor
by H. J. Sanders
Attorney

March 17, 1953　　　　　W. R. CHANCELLOR　　　　　2,631,636
ANTISKID DEVICE FOR VEHICLES
Filed Sept. 22, 1951　　　　　　　　　　　　　　　2 SHEETS—SHEET 2
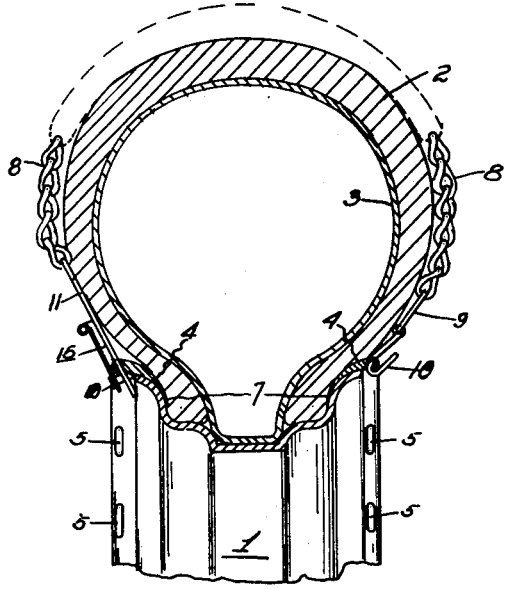
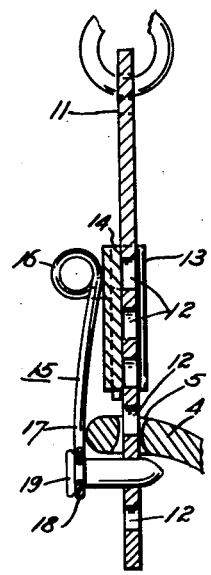
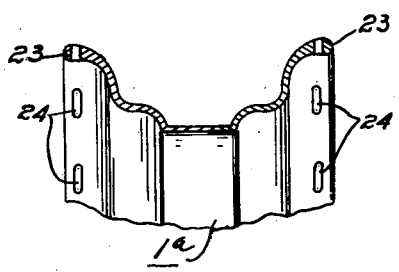
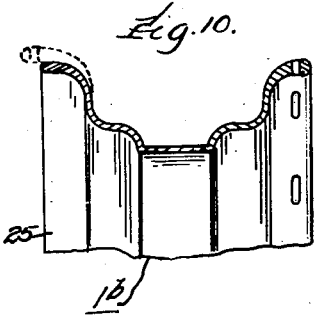
Inventor.
William R. Chancellor.
by H. J. Sanders
Attorney.

Patented Mar. 17, 1953

2,631,636

UNITED STATES PATENT OFFICE 2,631,636

ANTISKID DEVICE FOR VEHICLES

William R. Chancellor, Chicago, Ill., assignor of one-half to Edward S. Russell, Chicago, Ill.

Application September 22, 1951, Serial No. 247,819

3 Claims. (Cl. 152—233)

This invention relates to anti-skid devices for vehicles. One object is to provide a device that is readily applied to the vehicle wheels and as easily removed, that is efficient in operation and that will encourage the use of chains about the vehicle wheels which use has become more or less unpopular due to the difficulty of application and removal.

A further object is to provide an anti-skid device employing the usual chains wherein any individual chain may be easily removed and replaced when broken or worn without dismounting the complete chain assembly, and that may be applied or removed easily even in deep snow, on ice or in mud and under substantially any and all conditions by the vehicle driver without the necessity of previous experience.

A further object is to provide an anti-skid device that is of good appearance, simple in construction, durable in use and inexpensive in manufacture. Other advantages and novel features will be disclosed as the description of the invention proceeds and the novel features thereof will be pointed out and defined in the appended claims.

This invention resides in the construction and arrangement of parts hereinafter described, delineated in the accompanying drawings, and particularly pointed out in that portion of the device wherein patentable novelty is claimed for certain features of the invention, it being understood that, within the scope of what hereinafter is claimed, various changes in form, proportions, materials of manufacture, size and minor details of the invention may be made without departing from the spirit of the invention, or sacrificing any of the details thereof.

In describing the invention in detail reference is had to the accompanying drawings, forming part of this disclosure, wherein I have illustrated embodiments of the invention, and wherein like reference characters denote corresponding parts throughout the several views and in which—

Fig. 8 is a cross-sectional view through a vehicle tire and rim illustrating the application of the instant anti-skid device.

Figs. 9 and 10 are fragmentary sectional views through slightly modified types of rims that may be employed.

Fig. 11 is a longitudinal sectional view through Fig. 3 taken substantially along the line 11—11, and, Fig. 12 is a view in elevation of Fig. 10.

Figure 1:
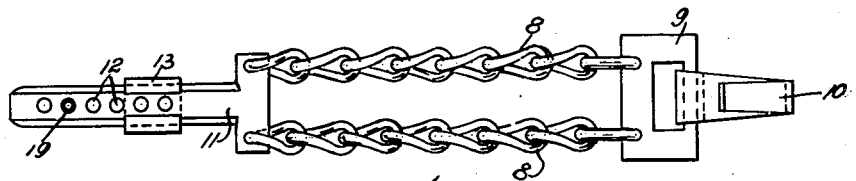
Fig. 1 is a plan view of skid chains and associated elements forming part of my device.
Figure 2:
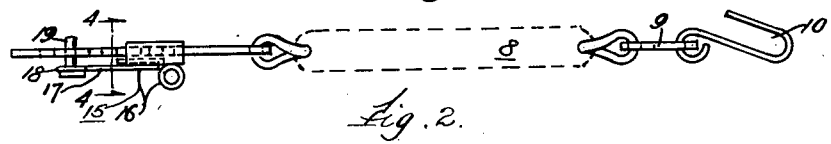
Fig. 2 is a view of Fig. 1 in side elevation.
Figure 3:
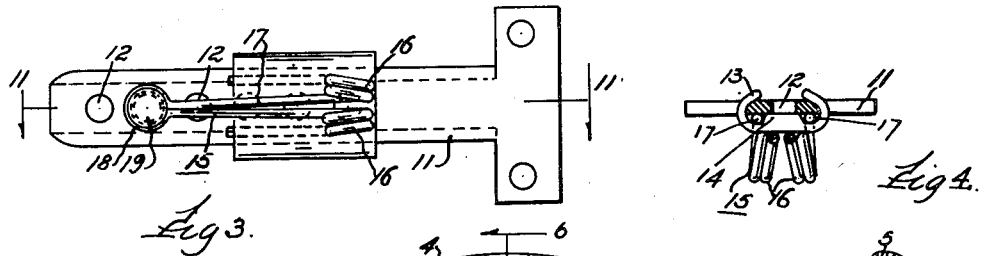
Fig. 3 is a plan view opposite to Fig. 1, enlarged, of the adjustable clip elements of Figs. 1 and 2.

Referring now to all figures of the drawings except Figs. 9, 10 and 12 the reference numeral 1 denotes a conventional automobile drop center rim, 2 the tire casing and 3 the inner tube. With the tire deflated I apply an adapter insert desirably sectional ring 4 between each rim flange and the tire casing. The ring 4 is substantially saucer-shape with the bottom of the saucer omitted, the ring being rounded and tapered from its outer thick portion, formed with a plurality of spaced perforations 5, to its thin inner flange-like portion 7 conforming to the wheel rim-flange periphery to facilitate application and removal of the adapter ring when the tire is deflated and retention of the ring when the tire is inflated, the ring sections at their meeting terminals 5a having a mortise and tenon structure to further facilitate ring application. This ring is of attractive design and finish so that its presence does not detract in any way from the beauty of the vehicle and it may, if desired, be left in place indefinitely.

Figure 4:
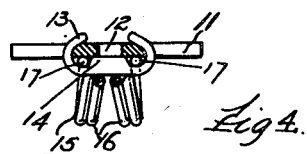
Fig. 4 is a cross-sectional view through Fig. 2 on the line 4—4.
Figure 5:
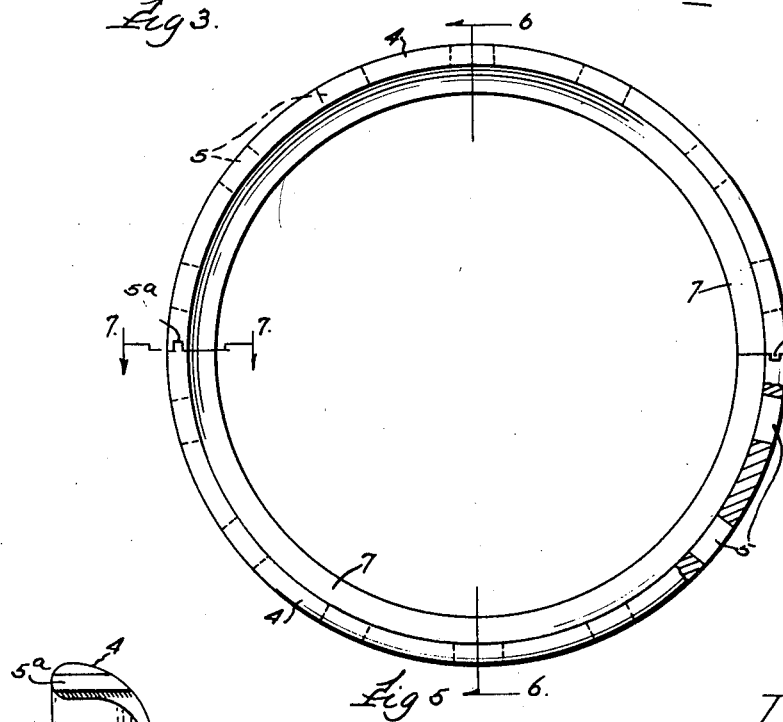
Fig. 5 is a face view of an adapter or insert ring employed in a preferred embodiment of the invention.
Figure 6:
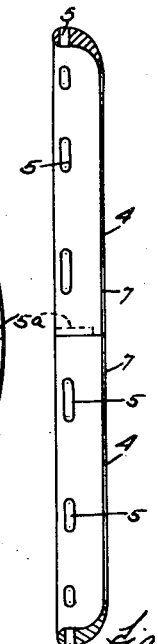
Fig. 6 is a sectional view taken substantially on the line 6—6 of Fig. 5.
Figure 7:
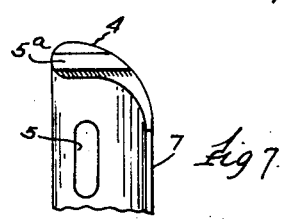
Fig. 7 is an enlarged detail view taken along the line 7—7 of Fig. 5.

The anti-skid device includes a pair of anti-skid members preferably in the form of chains 8 parallel to each other and spaced apart and extending across the tire 2, one terminal link of each chain secured to a rectangular perforate plate 9 that pivotally carries the hook 10 for engagement with a ring perforation 5. The opposite terminal link of each chain 8 is secured to the head end of the T-shaped clip 11 the shank of which is formed with a plurality of spaced perforations 12. Arranged upon the shank of the clip 11 is the slide 13 desirably oblong in shape and substantially C-shaped in cross-section formed with a longitudinally extending boss portion 14, clearly shown in Fig. 4, upon opposite sides of which within the slide extend the ends of a spring bracket 15 carried by said slide, the ends of said bracket extending through the slide and defining spring coils 16 from which the arms 17 extend beyond said slide and are shaped to define a grip 18 carrying the pin 19 recessed to retain said grip and adapted for engagement with the clip perforations selectively as said slide is moved along said clip.

In use, after the adapter rings are applied the hooks 10 are secured to said rings upon one side of the tire and the balance of the device passed about the tire whereupon the free end of the clip is passed through the adapter ring perforation 5 upon the opposite side of the tire and the pin 19 disposed in a clip perforation 12 immediately beyond said ring with respect to the slide 13. The pressure of the spring bracket 15 will retain the pin 19 yieldingly in engagement with the clip 11 thus, with the hook 10, retaining the anti-skid device securely in place. One, two or more anti-skid devices or units may be arranged about the tire.

Referring now to Fig. 9 a rim 1a is provided instead of the conventional rim 1, having terminally thickened flanges 23 formed with perforations 24 and in these perforations hooks 10 and clips 11 are received after the device is passed about the tire. In this form the adapter rings are not employed.

In Figs. 10 and 12 a rim 1b is shown that employs but one adapter ring that is inserted between the outside flange 25 and the tire casing, the flange 25 being of lesser thickness at its outermost edge and devoid of perforations. In this type of rim the chains and connections are applied to the adapter ring upon the outer thin flange and to the perforations 5 in the inside flange.

What is claimed is:

1. The combination with a vehicle wheel rim and a tire mounted on said rim, of a pair of chains spaced apart extending about the tire, a plate carried by terminal links at one end of said chains, a hook carried by said plate, a perforate T-shaped clip carried by terminal links at the other end of said chains, perforate adapter rings engaged by and clamped between said rim and inflated tire upon opposite sides of said tire, the adapter ring upon one side of said tire receiving said hook in its perforations, the adapter ring upon the opposite side of said tire receiving said clip in its perforations, a slide carried by said clip, a spring bracket carried by said slide, and a pin carried by said bracket in a clip perforation beyond said adapter ring with relation to said slide.

2. The combination with a perforate vehicle wheel rim and a tire mounted on said rim, of a pair of chains about said tire, a plate carried by terminal links at one end of said chains, a hook carried by said plate engaging a perforation in said rim, a perforate T-shaped clip carried by terminal links at the other end of said chains engaging a rim perforation, a slide carried by said clip, a spring bracket carried by said slide, and a pin carried by said bracket engaging a clip perforation beyond said rim with relation to said slide.

3. In a vehicle wheel and tire assembly, said assembly including a perforate member, a pair of chains about said tire, a plate carried by terminal links at one end of said chains, a hook carried by said plate engaging said assembly perforate member upon one side of said tire, a perforate clip carried by terminal links at the other end of said chains engaging said assembly perforate member upon the opposite side of said tire, a slide carried by said clip, a spring bracket carried by said slide, and a pin carried by said spring bracket engaging a clip perforation beyond said assembly perforate member with relation to said slide.

WILLIAM R. CHANCELLOR.

REFERENCES CITED

The following references are of record in the file of this patent:

UNITED STATES PATENTS

| Number | Name | Date |
|---|---|---|
| 1,199,686 | Geake | Sept. 26, 1916 |
| 2,241,592 | Goldenberg | May 13, 1941 |
| 2,539,517 | Locke | Jan. 30, 1951 |